(12) United States Patent
Yamagiwa et al.

(10) Patent No.: US 8,374,336 B2
(45) Date of Patent: Feb. 12, 2013

(54) PORTABLE TERMINAL

(75) Inventors: Daisuke Yamagiwa, Daito (JP);
Yoshihisa Nishigori, Daito (JP);
Yasuhiro Shingin, Daito (JP); Seiki Jinno, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 227 days.

(21) Appl. No.: 12/828,607

(22) Filed: Jul. 1, 2010

(65) Prior Publication Data

US 2011/0075955 A1 Mar. 31, 2011

(30) Foreign Application Priority Data

Jul. 2, 2009 (JP) ................................. 2009-157509

(51) Int. Cl.
*H04M 1/00* (2006.01)
*H04M 9/00* (2006.01)
(52) U.S. Cl. ................... 379/433.12; 455/575.4
(58) Field of Classification Search ............. 379/433.11, 379/433.12; 455/575.1, 575.4; 361/679.02, 361/679.3; 16/327, 328, 362
See application file for complete search history.

(56) References Cited

U.S. PATENT DOCUMENTS

| | | |
|---|---|---|
| 2005/0104856 A1 | 5/2005 | Jacobs et al. |
| 2005/0104857 A1 | 5/2005 | Jacobs et al. |
| 2006/0146014 A1 | 7/2006 | Lehtonen |
| 2008/0051161 A1 | 2/2008 | Tashiro |
| 2008/0318647 A1 | 12/2008 | Todune |

FOREIGN PATENT DOCUMENTS

| | | |
|---|---|---|
| JP | 2008-33595 A | 2/2008 |
| JP | 2008-283272 A | 11/2008 |
| JP | 2009-3614 A | 1/2009 |
| JP | 2009-110514 A | 5/2009 |
| WO | WO 2008/063017 A1 | 5/2008 |
| WO | WO 2008/147074 A2 | 12/2008 |

OTHER PUBLICATIONS

European Search Report dated Dec. 2, 2010 (six (6) pages).

*Primary Examiner* — Tuan D Nguyen
(74) *Attorney, Agent, or Firm* — Crowell & Moring LLP

(57) ABSTRACT

This portable terminal includes an operating portion-side housing having an operating portion-side guide portion, a display portion-side housing having a display portion-side guide portion, a sliding plate arranged between the display portion-side housing and the operating portion-side housing, a first sliding member, and a second sliding member. The operating portion-side guide portion is engaged with the sliding plate through the first sliding member, and the display portion-side guide portion is engaged with the sliding plate through the second sliding member.

19 Claims, 10 Drawing Sheets

INITIAL STATE

DIRECTION X: FIRST DIRECTION
DIRECTION Y: SECOND DIRECTION

NON-SLID

DIRECTION X: FIRST DIRECTION
DIRECTION Y: SECOND DIRECTION

SLID IN HORIZONTAL DIRECTION
(DIRECTION X)

DIRECTION X: FIRST DIRECTION
DIRECTION Y: SECOND DIRECTION

NON-SLID (INITIAL STATE)

DIRECTION X: FIRST DIRECTION
DIRECTION Y: SECOND DIRECTION

SLID IN VERTICAL DIRECTION
(DIRECTION Y)

DIRECTION X: FIRST DIRECTION
DIRECTION Y: SECOND DIRECTION

DIRECTION X: FIRST DIRECTION
DIRECTION Y: SECOND DIRECTION

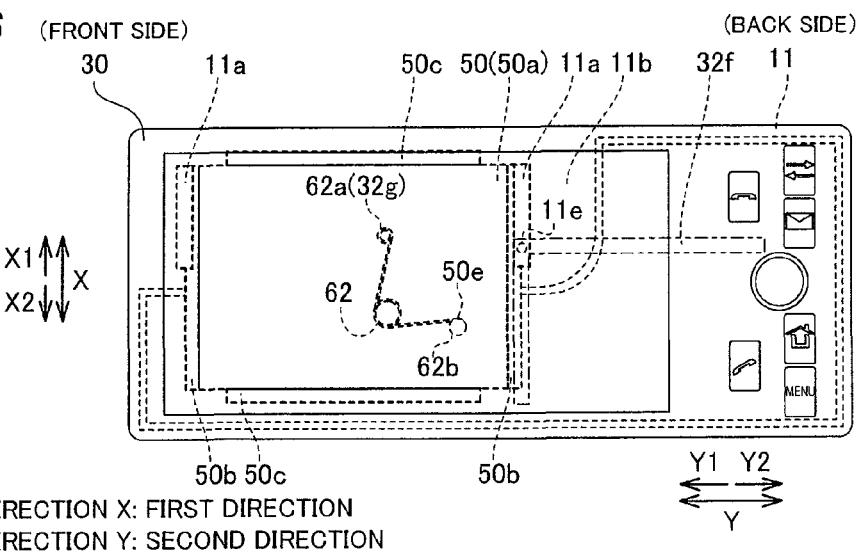
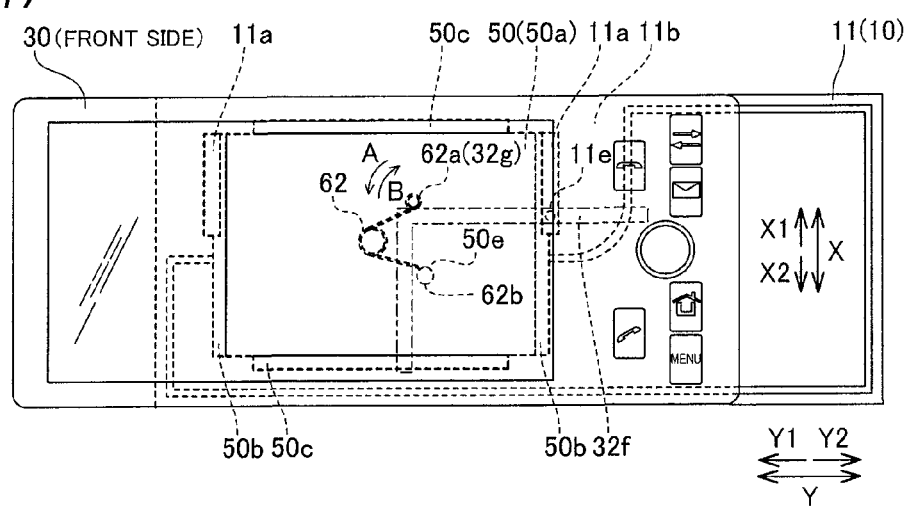
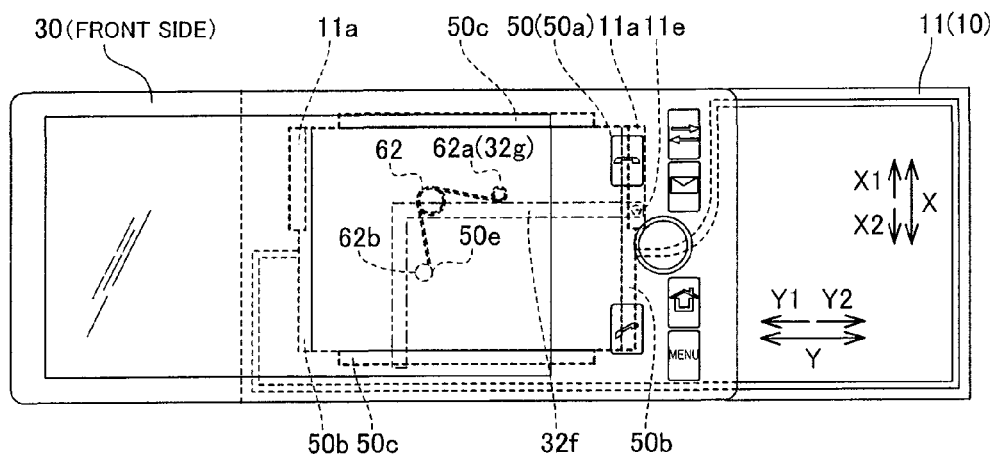

PORTABLE TERMINAL

BACKGROUND OF THE INVENTION

1. Field of the Invention

The present invention relates to a portable terminal, and more particularly, it relates to a portable terminal having a display portion-side housing slidingly movable with respect to an operating portion-side housing.

2. Description of the Background Art

A portable terminal having a display portion-side housing slidingly movable with respect to an operating portion-side housing is known in general, as disclosed in each of Japanese Patent Laying-Open Nos. 2009-3614, 2008-283272 and 2008-33595, for example.

The aforementioned Japanese Patent Laying-Open No. 2009-3614 discloses an electronic apparatus (portable terminal) including a lid body having a display portion, a base body having an operating portion and a platelike sliding member arranged to be held between the lid body and the base body. This electronic apparatus is so formed that the user uses the same as a portable telephone by vertically slidingly moving the lid body with respect to the base body through the sliding member from a state where the lid body and the base body are completely superposed with each other and uses the same as a PC terminal by horizontally slidingly moving the lid body with respect to the base body through the sliding member. The sliding member is provided with thin platelike edge portions on four sides extending along the vertical and horizontal directions respectively, so that the edge portions are slidingly moved with respect to the guide portion in a state directly fitted into groovelike guide portions mounted on the lid body and the base body respectively. Thus, the lid body is slidingly moved with respect to the base body in the vertical and horizontal directions respectively.

The aforementioned Japanese Patent Laying-Open No. 2008-283272 discloses an electronic apparatus (portable terminal) including a first member having a display portion, a second member having an operating portion and a base body (sliding plate) of a metal arranged to be held between the first and second members. This electronic apparatus is so formed that the user can vary the mode (appearance) thereof by slidingly moving the first member with respect to the second member in a first direction (vertical direction) or a second direction (horizontal direction) through the base body from a state where the first member is completely superposed on the second member. Thus, the electronic apparatus is so formed that the user can use the same as a portable telephone or an information input terminal. A pair of thin platelike edge portions extending in the longitudinal direction (first direction) are formed on side end portions of the base body, to be directly fitted into a first sliding body having groovelike guide rail portions mounted on the second member and slidingly moved with respect to the guide rail portions. Further, a pair of guide rail portions extending in the short-side direction (second direction) are formed on the upper surface of the base body by uprighting a sheet metal member, so that thin platelike edge portions of a second sliding body mounted on the first member are directly fitted into the guide rail portions of the base body and slidingly moved with respect to the guide rail portions.

The aforementioned Japanese Patent Laying-Open No. 2008-33595 discloses a portable terminal including a first housing having a display portion and a second housing having an operating key (operating portion). This portable terminal is so formed that the user can vary the mode (appearance) thereof by vertically or horizontally slidingly moving the first housing with respect to the second housing from a state where the first housing is completely superposed on the second housing. Thus, the portable terminal is so formed that the user can use the same as a camera or an information input terminal (PDA). The portable terminal is so formed that a columnar protrusion provided on the back surface of the first housing directly engages with an L-shaped guide groove formed on the surface of the second housing superposed on the first housing and moves in the guide groove, thereby slidingly moving the first housing with respect to the second housing.

In the electronic apparatus described in the aforementioned Japanese Patent Laying-Open No. 2009-3614, however, the thin platelike edge portions of the base body are directly fitted into the groovelike guide portions mounted on the lid body and the base body respectively, and hence jolting is conceivably easily caused between the edge portions and the guide portions due to the small thickness of the edge portions. Therefore, the electronic apparatus disadvantageously easily jolts when the user slidingly moves the lid body with respect to the operating portion.

Also in the electronic apparatus described in the aforementioned Japanese Patent Laying-Open No. 2008-283272, the thin platelike edge portions of the base body are directly fitted into the groovelike guide rail portions mounted on the second member while the thin platelike edge portions of the second sliding body mounted on the first member are directly fitted into the guide rail portions of the base body. Thus, jolting is conceivably easily caused between the edge portions and the guide rail portions due to the small thickness of the edge portions of the base body and the second sliding body. Therefore, the electronic apparatus disadvantageously easily jolts when the user slidingly moves the first member with respect to the second member.

In the portable terminal described in the aforementioned Japanese Patent Laying-Open No. 2008-33595, the columnar protrusion of the first housing moves in the guide groove of the second housing in the state directly engaging with the guide groove, and hence jolting is conceivably easily caused between the protrusion and the guide groove. Therefore, the portable terminal disadvantageously jolts when the user slidingly moves the first housing with respect to the second housing.

SUMMARY OF THE INVENTION

The present invention has been proposed in order to solve the aforementioned problems, and an object of the present invention is to provide a portable terminal capable of suppressing jolting when the user slidingly moves a housing.

A portable terminal according to an aspect of the present invention includes an operating portion-side housing, provided with an operating portion, having an operating portion-side guide portion, a display portion-side housing, provided with a display portion, having a display portion-side guide portion, a sliding plate arranged between the display portion-side housing and the operating portion-side housing for relatively slidingly moving the display portion-side housing with respect to the operating portion-side housing in a first direction and a second direction intersecting with the first direction, a first sliding member arranged between the operating portion-side guide portion of the operating portion-side housing and the sliding plate and a second sliding member arranged between the display portion-side guide portion of the display portion-side housing and the sliding plate, while the operating portion-side guide portion of the operating portion-side housing is engaged with the sliding plate through the first sliding member, and the display portion-side guide portion of the display portion-side housing is engaged with the sliding plate through the second sliding member.

As hereinabove described, the portable terminal according to the aspect of the present invention is provided with the first sliding member and the second sliding member while the operating portion-side guide portion of the operating portion-side housing is engaged with the sliding plate through the first sliding member and the display portion-side guide portion of the display portion-side housing is engaged with the sliding plate through the second sliding member, whereby clearances between the sliding plate and the operating portion-side guide portion and between the sliding plate and the display portion-side guide portion can be further reduced due to the first sliding member and the second sliding member interposed between the sliding plate and the operating portion-side guide portion and between the sliding plate and the display portion-side guide portion respectively. Thus, both of the display portion-side housing and the operating portion-side housing can be inhibited from jolting when the user slidingly moves the display portion-side housing with respect to the operating portion-side housing.

In the portable terminal according to the aforementioned aspect, the sliding plate is preferably made of a metal, while the first sliding member and the second sliding member are preferably made of resin respectively. According to this structure, frictional noises resulting from rubbing between the sliding plate and the first sliding member and between the sliding plate and the second sliding member can be reduced as compared with a case where both of the sliding plate and the first or second sliding member are made of metals, due to the contact between the metal member and the resin members. Therefore, jolting in sliding movement can be reduced while reducing noises (scrabbly noises) resulting from the sliding movement.

In the portable terminal according to the aforementioned aspect, the sliding plate preferably includes a first engaging portion provided to extend in the first direction and a second engaging portion provided to extend in the second direction, the first sliding member is preferably engaged with the operating portion-side guide portion of the operating portion-side housing in a state arranged to hold the first engaging portion of the sliding plate, and the second sliding member is preferably engaged with the display portion-side guide portion of the display portion-side housing in a state arranged to hold the second engaging portion of the sliding plate. According to this structure, the first sliding member and the second sliding member can slidably retain the sliding plate while holding the sliding plate together. Thus, contact areas between the sliding plate and the first and second sliding members can be sufficiently ensured, whereby both of the display portion-side housing and the operating portion-side housing can be reliably inhibited from jolting when the user slidingly moves the display portion-side housing with respect to the operating portion-side housing.

In the aforementioned structure having the sliding plate including the first engaging portion and the second engaging portion, the operating portion-side guide portion and the display portion-side guide portion preferably have substantially L-shaped sections respectively, the first sliding member and the second sliding member preferably have substantially U-shaped sections respectively, and the portable terminal is preferably so formed that the first engaging portion of the sliding plate is fitted into a groove portion of the substantially U-shaped first sliding member in a state where the substantially U-shaped first sliding member is fitted into a space between the upper surface of the operating portion-side housing and the substantially L-shaped operating portion-side guide portion while the second engaging portion of the sliding plate is fitted into a groove portion of the substantially U-shaped second sliding member in a state where the second sliding member is fitted into a space between the lower surface of the display portion-side housing and the substantially L-shaped display portion-side guide portion. According to this structure, the first engaging portion (second engaging portion) can be slidably retained with respect to the operating portion-side guide portion (display portion-side guide portion) through a wider contact area by utilizing both of the inner side surface and the outer side surface of the first sliding member (second sliding member).

In the aforementioned structure having the sliding plate including the first engaging portion and the second engaging portion, the sliding plate is preferably formed to be slidingly moved with respect to the operating portion-side housing along the first direction by slidingly the first engaging portion with respect to the inner side surface of a substantially U-shaped groove portion of the first sliding member holding the first engaging portion or by sliding the outer side surface of the first sliding member with respect to the operating portion-side guide portion of the operating portion-side housing. According to this structure, the user can easily slidingly move the sliding plate with respect to the operating portion-side housing in the first direction by effectively utilizing the inner side surface or the outer side surface of the first sliding member interposed between the operating portion-side housing and the sliding plate.

In this case, the display portion-side housing is preferably formed to be slidingly moved with respect to the sliding plate along the second direction by sliding the display portion-side guide portion with respect to the outer side surface of the second sliding member holding the second engaging portion. According to this structure, the user can easily slidingly move the display portion-side housing with respect to the sliding plate in the second direction by effectively utilizing the outer side surface of the second sliding member interposed between the display portion-side housing and the sliding plate.

In the aforementioned structure having the sliding plate including the first engaging portion and the second engaging portion, the operating portion-side guide portion is preferably integrally provided on the operating portion-side housing, while the display portion-side guide portion is preferably integrally provided on the display portion-side housing. According to this structure, increase in the number of components constituting the portable terminal can be suppressed, dissimilarly to a case of providing the operating portion-side guide portion independently of the operating portion-side housing or providing the display portion-side guide portion independently of the display portion-side housing. Consequently, a sliding mechanism can be simplified.

In the aforementioned structure having the sliding plate including the first engaging portion and the second engaging portion, a pair of display portion-side guide portions are preferably provided on the lower surface of the display portion-side housing to be opposed to each other at an interval in the first direction, while a pair of operating portion-side guide portions are preferably provided on the upper surface of the operating portion-side housing to be opposed to each other at an interval along the second direction, the first engaging portions are preferably provided on both end portions of the sliding plate in the first direction while the second engaging portions are preferably provided on both end portions of the sliding plate in the second direction, and the sliding plate is preferably so formed that the first engaging portions are retained by the pair of display portion-side guide portions and the second engaging portions are retained by the pair of operating portion-side guide portions in plan view. According to this structure, the user can stably slidingly move the sliding plate with respect to the operating portion-side guide portion and the display portion-side guide portion in both of the first and second directions.

In this case, the sliding plate preferably further includes a planar portion connecting the first engaging portions and the second engaging portions with each other, and the first engaging portions are preferably provided on vertical positions closer to the operating portion-side housing than the planar portion, while the second engaging portions are preferably provided on vertical positions closer to the display portion-side housing, opposite to the first engaging portions, than the planar portion. According to this structure, the first engaging portions and the second engaging portions are retained by the operating portion-side guide portions and the display portion-side guide portions on different vertical positions respectively. Thus, the user can relatively slidingly move the operating portion-side housing and the display portion-side housing in the direction (first or second direction) of movement with no interference therebetween.

In the aforementioned structure having the sliding plate including the first engaging portion and the second engaging portion, the first engaging portion and the second engaging portion are preferably integrally formed on the sliding plate. According to this structure, at least either the first engaging portion or the second engaging portion can be easily inhibited from coming off the sliding plate, dissimilarly to a case of providing the first engaging portion and the second engaging portion independently of the sliding plate.

In the aforementioned structure having the sliding plate including the first engaging portion and the second engaging portion, the portable terminal is preferably so formed that the sliding plate is slidingly moved with respect to the operating portion-side guide portion along the first direction while the display portion-side housing is slidingly moved with respect to the sliding plate along the second direction. According to this structure, the user can move the display portion-side housing in the first direction by moving the sliding plate with respect to the display portion-side housing, and can move the display portion-side housing in the second direction by moving the display portion-side housing with respect to the sliding plate. Thus, the user can efficiently slidingly move the display portion-side housing with respect to the operating portion-side housing in each of the first direction and the second direction.

In this case, the length of the first engaging portion of the sliding plate is preferably larger than the length of the operating portion-side guide portion, while the length of the second engaging portion of the sliding plate is preferably smaller than the length of the display portion-side guide portion. According to this structure, the user can stably slidingly move the sliding plate with respect to the operating portion-side housing in a moving range along the first direction. Further, the user can stably slidingly move the display portion-side housing with respect to the sliding plate in a moving range along the second direction.

In the aforementioned structure having the sliding plate slidingly moved along the first direction and the display portion-side housing slidingly moved along the second direction, the first sliding member is preferably fixed to the operating portion-side guide portion of the operating portion-side housing, or fixed to the first engaging portion of the sliding plate. According to this structure, the user can easily slidingly move the sliding plate with respect to the operating portion-side housing.

The portable terminal according to the aforementioned aspect preferably further includes an operating key portion including a first operating key employed in a case of slidingly moving the display portion-side housing with respect to the operating portion-side housing in the first direction and a second operating key employed in a case of slidingly moving the display portion-side housing with respect to the operating portion-side housing in the second direction. According to this structure, the operating key portion can be used as the first operating key or the second operating key in response to the position of the display portion-side housing slidingly moved with respect to the operating portion-side housing, whereby increase in the number of components can be suppressed and the structure of the portable terminal can be simplified as compared with a case of providing the first operating key and the second operating key independently of each other.

The portable terminal according to the aforementioned aspect preferably further includes a first spring member provided to couple the sliding plate and the operating portion-side housing with each other for generating urging force for sliding movement in the first direction when relatively slidingly moving the display portion-side housing with respect to the operating portion-side housing in the first direction, and a second spring member provided to couple the sliding plate and the display portion-side housing with each other for generating urging force for sliding movement in the second direction when relatively slidingly moving the display portion-side housing with respect to the operating portion-side housing in the second direction. According to this structure, the user can slidingly move the display portion-side housing with respect to the operating portion-side housing in the first and second directions through the urging force of the first and second spring members, thereby easily slidingly moving the display portion-side housing.

In the aforementioned structure further including the first spring member and the second spring member, the sliding plate preferably includes a first engaging portion provided to extend in the first direction, a second engaging portion provided to extend in the second direction, and a planar portion connecting the first engaging portion and the second engaging portion with each other, the first engaging portion is preferably provided on a vertical position closer to the operating portion-side housing than the planar portion while the second engaging portion is preferably provided on a vertical position closer to the display portion-side housing, opposite to the first engaging portion, than the planar portion, and the first spring member is preferably arranged in a region between a vertical position of the planar portion and the vertical position of the first engaging portion, while the second spring member is preferably arranged in a region between the vertical position of the planar portion and the vertical position of the second engaging portion. According to this structure, the first spring member can be easily stored in a stepped space formed by the planar portion and the first engaging portion, while the second spring member can be easily stored in a stepped space formed by the planar portion and the second engaging portion. Consequently, the user can slidingly move the display portion-side housing with respect to the operating portion-side housing without difficulty, despite the first and second spring members provided on the portable terminal.

In the aforementioned structure further including the first spring member and the second spring member, the first spring member and the second spring member are preferably torsion springs. According to this structure, driving force for slidingly moving the display portion-side housing with respect to the operating portion-side housing in the first and second directions can be easily obtained by properly utilizing the urging force (restoring force) of the torsion springs.

In the aforementioned structure having the sliding plate slidingly moved along the first direction and the display portion-side housing slidingly moved along the second direction, the first sliding member is preferably fixed to the operating portion-side guide portion of the operating portion-side housing. According to this structure, the user can easily slidingly move the sliding plate with respect to the operating portion-side housing.

In the portable terminal according to the aforementioned aspect, the operating portion-side housing preferably further includes a protrusion engaging with the display portion-side housing, the display portion-side housing preferably further includes a substantially L-shaped guide groove engaging with the protrusion when the display portion-side housing is slidingly moved with respect to the operating portion-side housing, the guide groove is preferably formed on the display portion-side housing in a state where the extensional directions of the guide groove substantially coincide with the respective ones of the first direction and the second direction, and the protrusion preferably so moves in the substantially L-shaped guide groove that, when the display portion-side housing is slidingly moved with respect to the operating portion-side housing along either the first direction or the second direction, the display portion-side housing is not slidingly moved with respect to the operating portion-side housing along either the second direction or the first direction. According to this structure, the user can regulate the direction of movement of the display portion-side housing with respect to the operating portion-side housing to either the first direction or the second direction, thereby easily switching a control mode for the portable terminal in response to each direction of movement.

In this case, the protrusion is preferably in the form of a pin, and integrally formed on the operating portion-side guide portion of the operating portion-side housing. According to this structure, the manufacturing process for and the structure of the operating portion-side housing can be simplified, dissimilarly to a case of providing the protrusion and the operating portion-side housing independently of each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 16 to 18 are plan views for illustrating arrangements of the spring member in a case where the display portion-side housing shown in FIG. 2 is slidingly moved with respect to the operating portion-side housing in a direction Y.

DESCRIPTION OF THE PREFERRED EMBODIMENTS

An embodiment of the present invention is now described with reference to the drawings.

First, the structure of a portable telephone 100 according to the embodiment of the present invention is described with reference to FIGS. 1 to 18. In this embodiment, the present invention is applied to the portable telephone 100 of a sliding type having a display portion-side body 30 slidingly moved with respect to an operating portion-side body 10 in directions X and Y, as an exemplary portable terminal according to the present invention.

Figure 1:
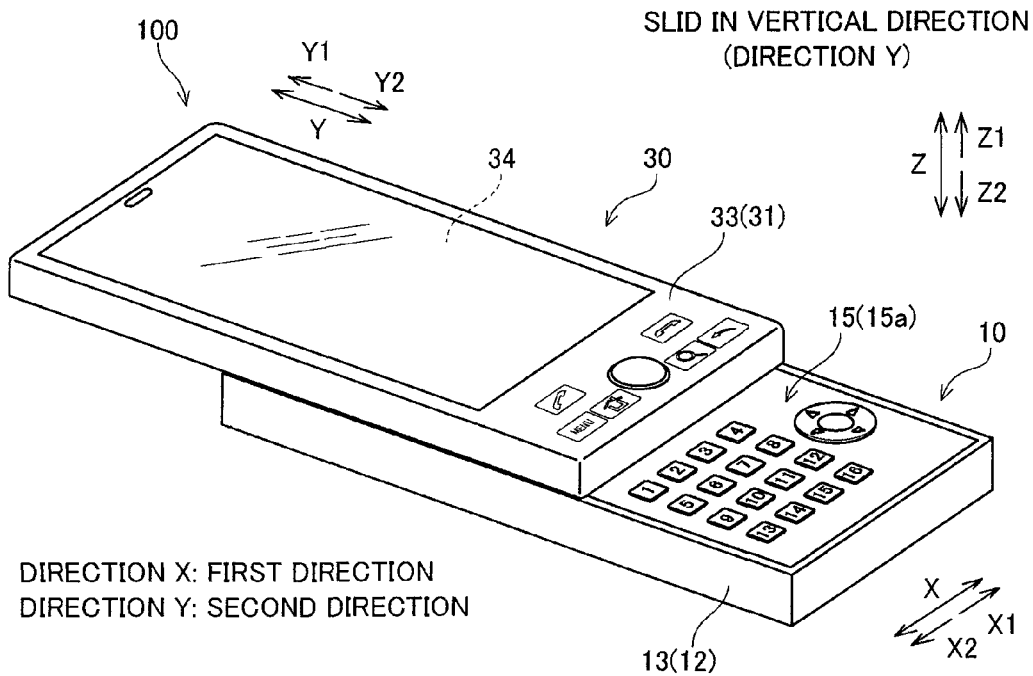
FIG. 1 is a perspective view showing a portable telephone according to an embodiment of the present invention in a state slid in the vertical direction.

The portable telephone 100 according to the embodiment of the present invention is formed as a portable terminal including a sliding mechanism. In other words, the portable telephone 100 includes the operating portion-side body 10 having a vertically elongated shape in plan view (as viewed from a direction Z) and the display portion-side body 30 mounted on the upper surface (along arrow Z1) of the operating portion-side body 10 to be slidingly movable with respect to the operating portion-side body 10 in the direction Y shown in FIG. 1 and the direction X shown in FIG. 2, as shown in FIG. 1. The directions X and Y are examples of the "first direction" and the "second direction" in the present invention respectively.

Figure 3:
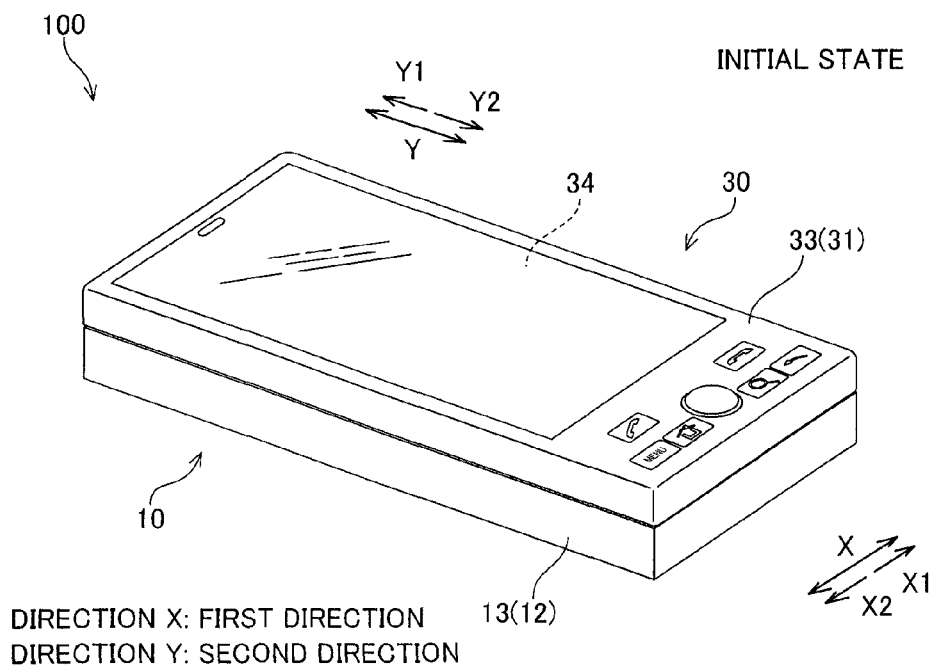
FIG. 3 is a perspective view showing the portable telephone according to the embodiment of the present invention in an initial non-slid state.

The portable telephone 100 is so formed that the user can retain the same while most reducing the plane area thereof in an initial state by completely superposing the display portion-side body 30 on the operating portion-side body 10 without slidingly moving the same, as shown in FIG. 3.

Figure 4:
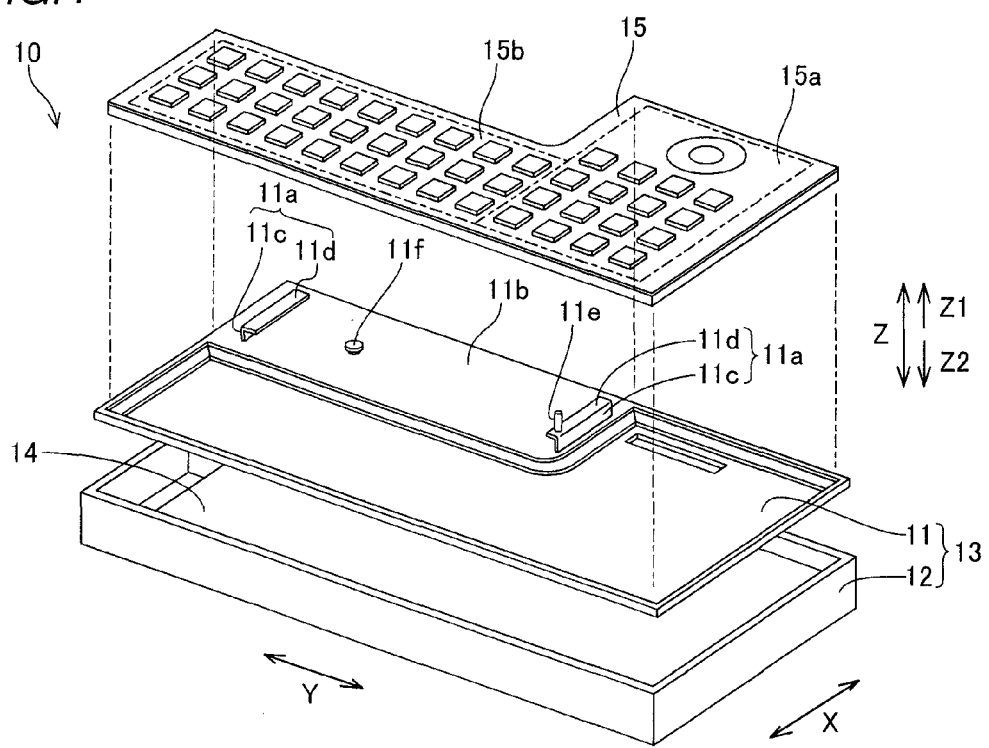
FIG. 4 is an exploded perspective view showing the structure of an operating portion-side body of the portable telephone according to the embodiment shown in FIG. 1.

The operating portion-side body 10 is constituted of an operating portion-side housing 13, an operating circuit board 14 and an operating key portion 15, as shown in FIG. 4. The operating portion-side housing 13 is formed by fitting a die-cast lid member 11 of a metal (Mg or Al) into a casing member 12 of resin such as polycarbonate (PC) resin or ABS resin in the direction Z. The operating circuit board 14, stored in the operating portion-side housing 13, enables the portable telephone 100 to implement various functions. The operating key portion 15 is in the form of a substantially L-shaped plate (sheet) in plan view, and arranged to cover a prescribed region of the lid member 11. Further, the operating key portion 15 is connected with the operating circuit board 14 through an FPC (flexible printed circuit board) (not shown). The operating portion-side housing 13 including the lid member 11 and the casing member 12 is an example of the "operating portion-side housing" in the present invention. The operating circuit board 14 and the operating key portion 15 are examples of the "operating portion" in the present invention.

Figure 5:
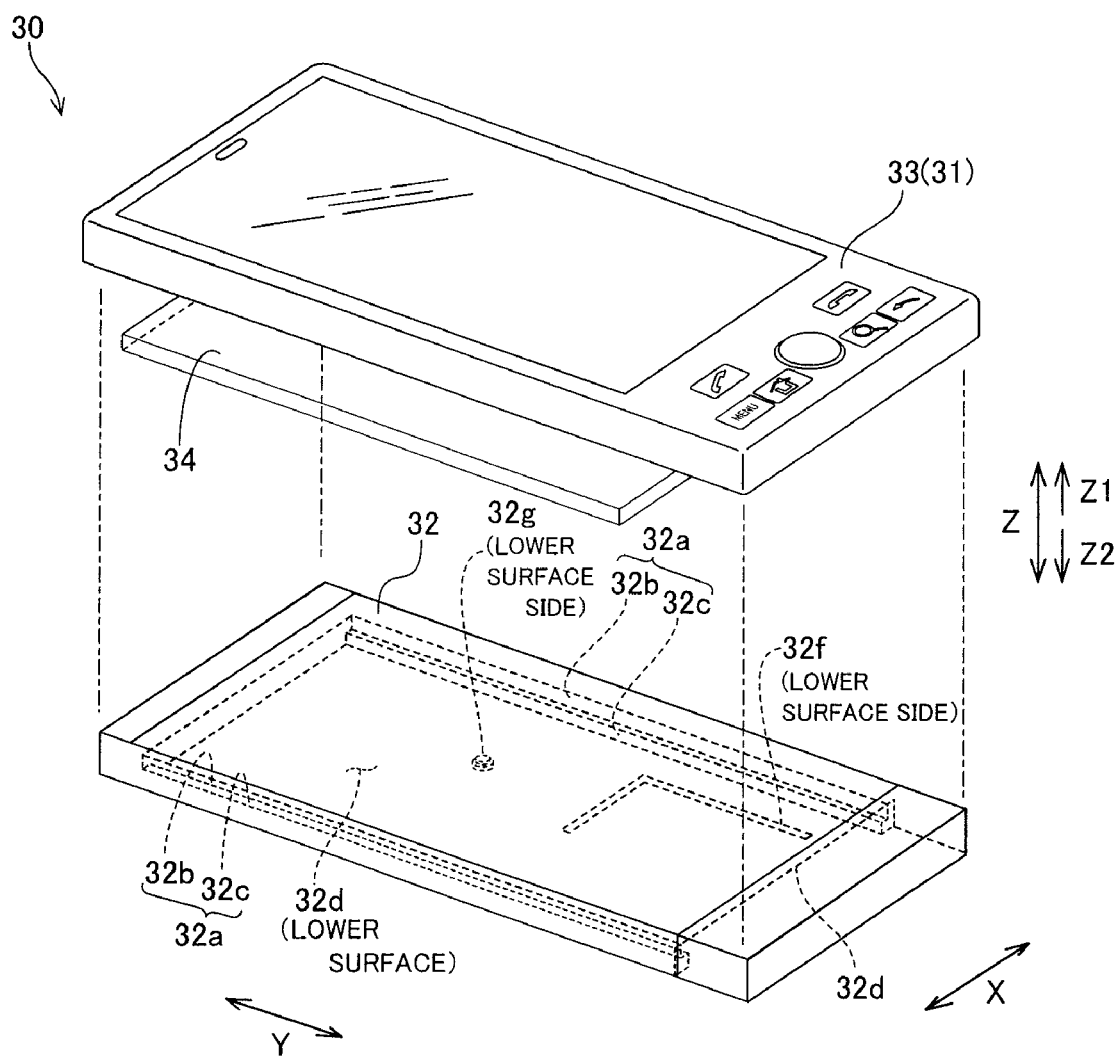
FIG. 5 is an exploded perspective view showing the structure of a display portion-side body of the portable telephone according to the embodiment shown in FIG. 1.

The display portion-side body 30 is constituted of a display portion-side housing 33 and a display portion 34 consisting of a liquid crystal display, as shown in FIG. 5. The display portion-side housing 33 is formed by fitting a panel portion 31 of resin such as polycarbonate (PC) resin or ABS resin into a die-cast casing member 32 of a metal (Mg or Al) in the direction Z. The display portion 34 is stored in the display portion-side housing 33, and connected with the operating circuit board 14 (see FIG. 4) through the FPC (not shown). Thus, the portable telephone 100 is so formed that the user operates the same through operating keys of a region 15a, exposed on the upper surface of the operating portion-side body 10, of the operating key portion 15 (see FIG. 4) while observing the display portion 34 in a state slidingly moving the display portion-side body 30 in a prescribed direction (direction Y), as shown in FIG. 1. The display portion-side housing 33 including the panel portion 31 and the casing member 32 is an example of the "display portion-side housing" in the present invention.

Figure 6:
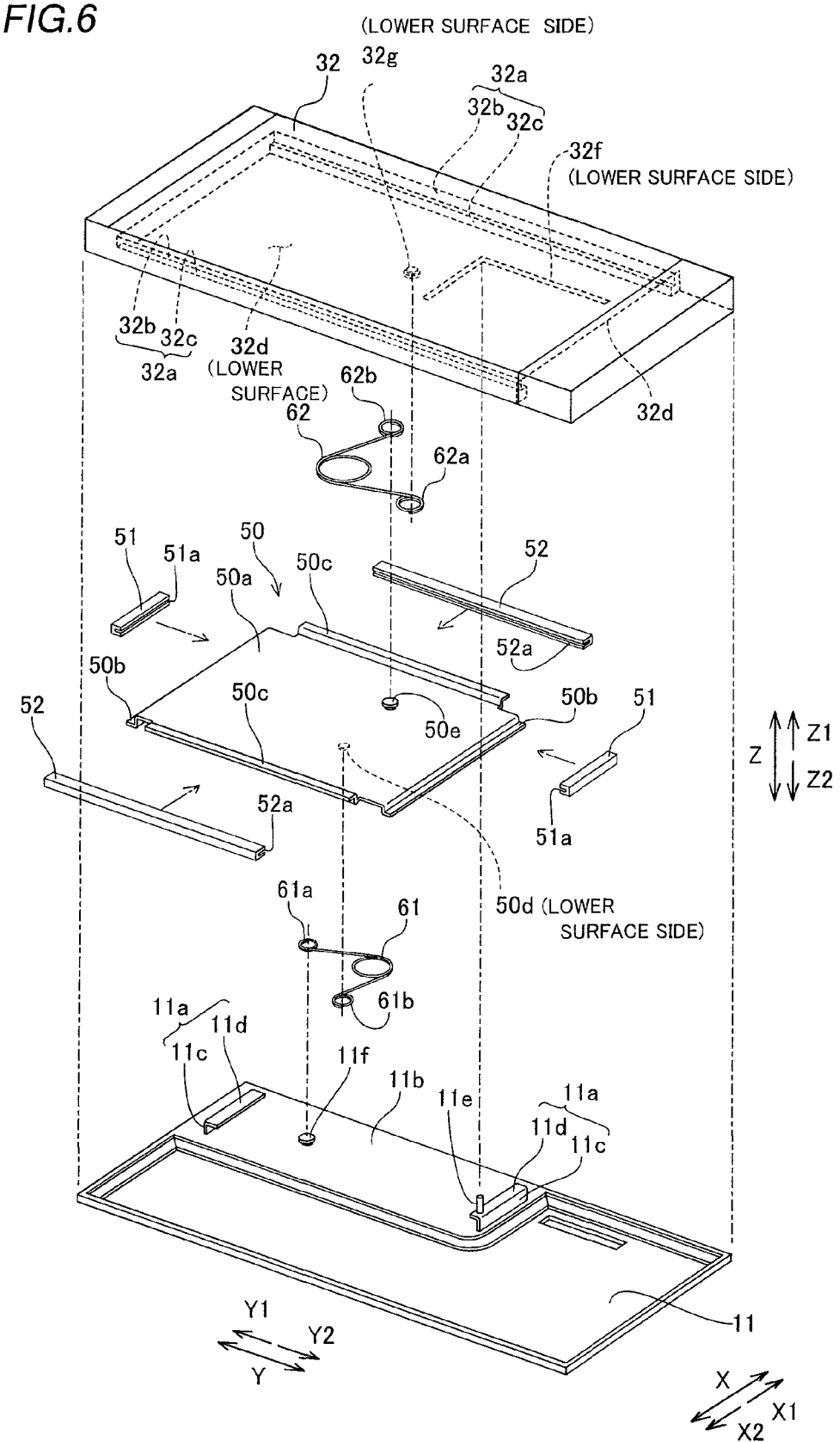
FIG. 6 is an exploded perspective view for illustrating a sliding mechanism for the portable telephone according to the embodiment shown in FIG. 1.

According to this embodiment, the casing member 12 of the operating portion-side body 10 (see FIG. 4) and the casing member 32 of the display portion-side body 30 (see FIG. 5) are connected with each other through a sliding plate 50 of sheet metal (metal), having a thickness of at least about 0.5 mm and not more than about 0.6 mm, arranged between the operating portion-side body 10 and the display portion-side body 30, as shown in FIG. 6.

This sliding mechanism is now described in detail. As shown in FIG. 6, a pair of guide portions 11a are integrally formed on the upper surface of the metal lid member 11 constituting the operating portion-side body 10 (see FIG. 4). The guide portions 11a are formed on a substantially rectangular region 11b, where the operating key portion 15 (see FIG. 4) is not arranged, of the lid member 11. The pair of guide portions 11a are formed to extend along the direction X in the vicinity of end portions of the region 11b in the direction Y. The guide portions 11a are examples of the "operating portion-side guide portion" in the present invention.

Figure 7:
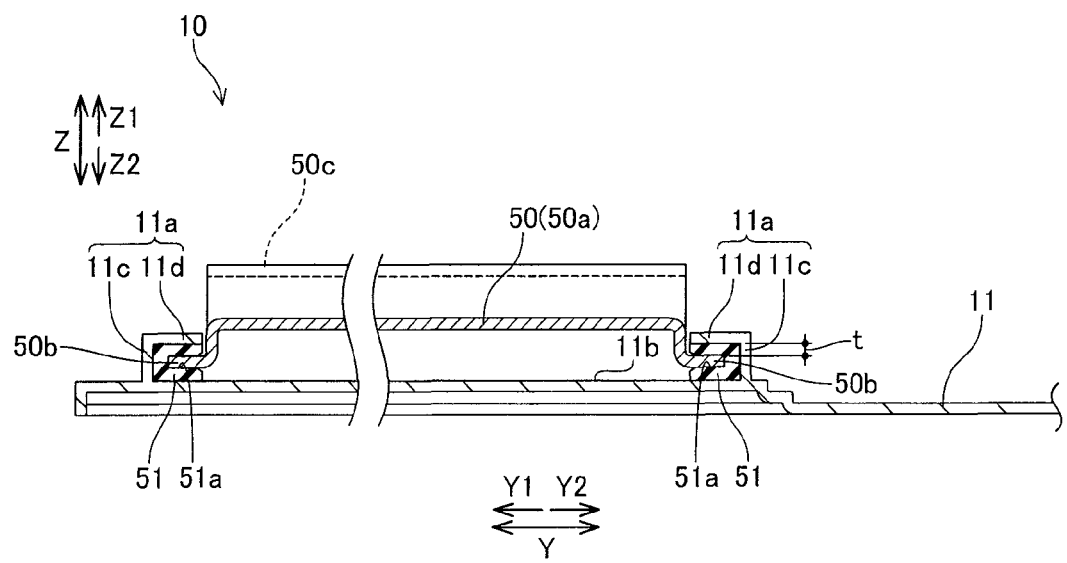
FIG. 7 is a partially fragmented sectional view showing an engaging state between a sliding plate and a lid member of the operating portion-side housing shown in FIG. 6.

As shown in FIGS. 6 and 7, the pair of guide portions 11a have sidewall portions 11c substantially perpendicularly protruding from the upper surface of the lid member 11 upward (along arrow Z1) with a height of about 2 mm and eaves portions 11d substantially perpendicularly extending from upper end portions of the sidewall portions 11c along arrows Y1 and Y2 respectively. In other words, the guide portions 11a have substantially L-shaped sections. The guide portions 11a are so formed that the same can retain sliders 51 of resin such as POM (polyacetal) having excellent slidableness in grovelike regions (see FIG. 7), extending in the direction X, surrounded by the upper surface, the sidewall portions 11c and the eaves portions 11d of the lid member 11 (region 11b). The sliders 51 are provided with groove portions 51a having a thickness t (see FIG. 7) of about 0.5 mm and substantially U-shaped sections. The groove portions 51a are formed to substantially linearly extend along the extensional direction (direction X in FIG. 6) of the guide portions 11a. Therefore, the sliders 51 are completely fitted into the grovelike regions of the guide portions 11a. As shown in FIG. 7, openings of the guide portions 11a and those of the groove portions 51a are identically directed (along arrow Y1 or Y2). The sliders 51 are examples of the "first sliding member" in the present invention.

As shown in FIG. 6, a pair of guide portions 32a are integrally formed on the casing member 32 constituting the display portion-side housing 30 (see FIG. 5). In other words, the pair of guide portions 32a are formed inside the casing member 32 in the vicinity of both end portions in the direction X, to extend along the direction Y. The guide portions 32a are formed to be exposed toward the lower surface 32d of the casing member 32, and hence FIG. 6 shows the guide portions 32a by broken lines. The guide portions 32a are examples of the "display portion-side guide portion" in the present invention.

Figure 8:
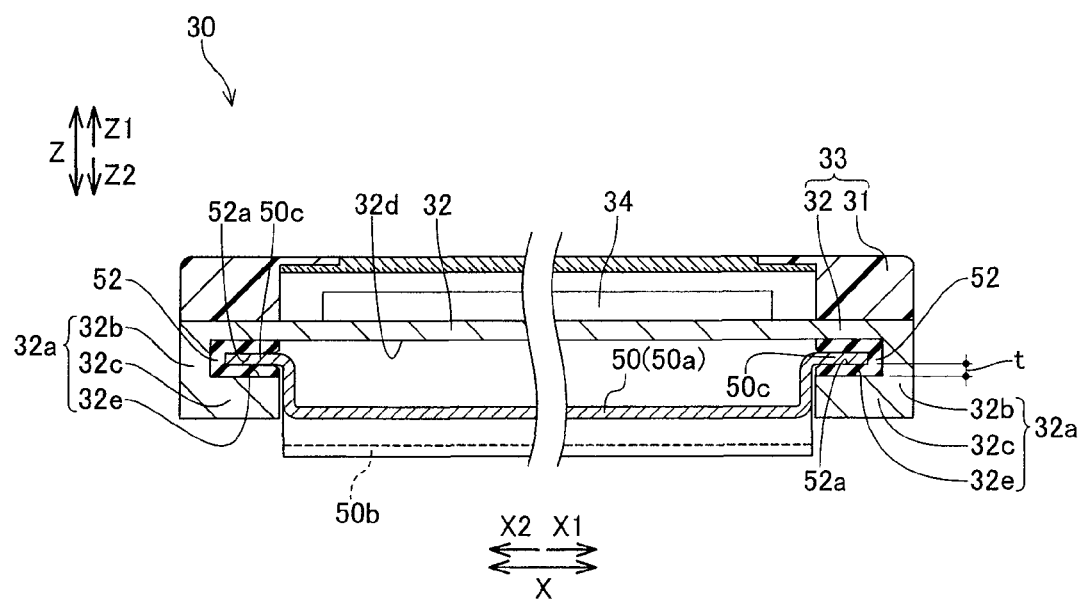
FIG. 8 is a partially fragmented sectional view showing an engaging state between the sliding plate and a casing member of the display portion-side housing shown in FIG. 6.
Figure 9:
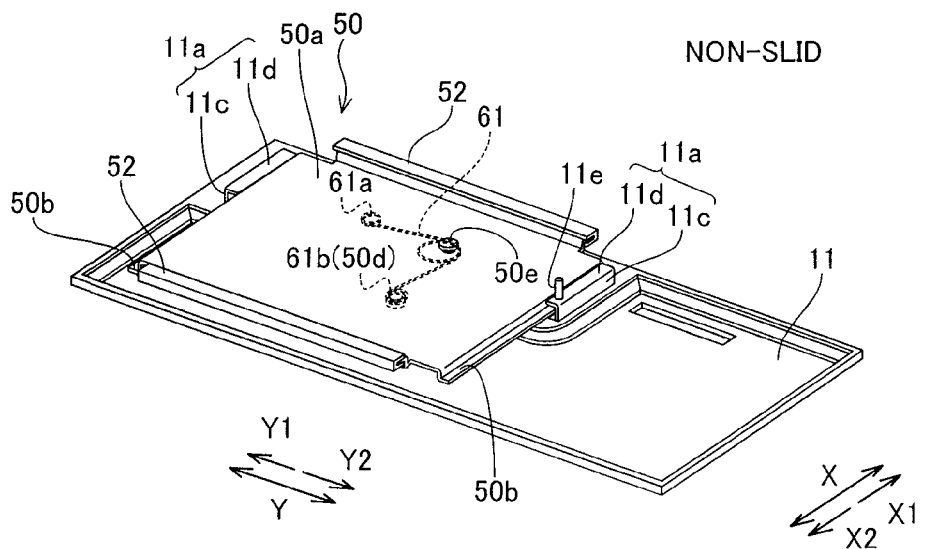
FIGS. 9 and 10 are perspective views showing engaging states between the sliding plate and the lid member of the operating portion-side housing shown in FIG. 6.
Figure 10:
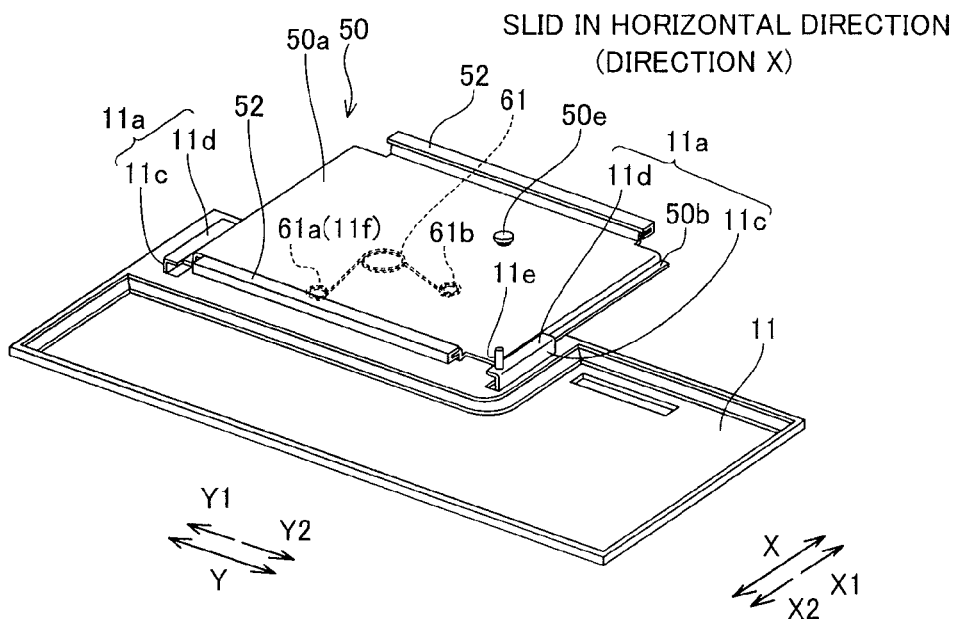
Figure 11:
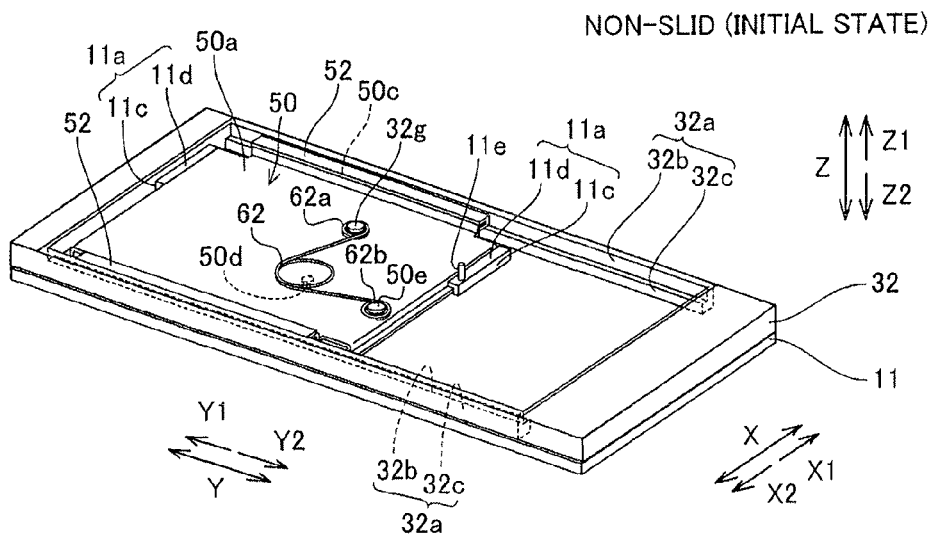
FIGS. 11 and 12 are perspective views showing engaging states between the sliding plate and the casing member of the display portion-side housing shown in FIG. 6.

As shown in FIGS. 6 and 8, the pair of guide portions 32a have sidewall portions 32b in the direction X of the casing member 32 and beam portions 32c protruding from the sidewall portions 32b in the horizontal direction (along arrows X1 and X2) respectively. The guide portion 32a are so formed that the same can retain sliders 52 of resin in groove portions 32e (see FIG. 8), extending in the direction Y, surrounded by the lower surface 32d, the sidewall portions 32d and the beam portions 32c of the casing member 32. The sliders 52 are provided with groove portions 52a having a thickness t (see FIG. 8) of about 0.5 mm and substantially U-shaped sections, and formed to substantially linearly extend in the extensional direction (direction Y in FIG. 6) of the guide portions 32a. Therefore, the sliders 52 are completely fitted into the groove portions 32e of the guide portions 32a. As shown in FIG. 8, openings of the groove portions 32e and those of the groove portions 52a are identically directed (along arrow X1 or X2). The sliders 52 are examples of the "second sliding member" in the present invention.

As shown in FIG. 6, the sliding plate 50 has a substantially rectangular planar portion 50a as well as a pair of edge portions 50b and another pair of edge portions 50c integrally formed on edges of the planar portion 50a by folding the sheet metal. The edge portions 50b are provided on end portions of the planar portion 50a in the direction Y, to extend in the direction X. On the other hand, the edge portions 50c are provided on end portions of the planar portion 50a in the direction X, to extend in the direction Y. The edge portions 50b are formed on vertical positions lower than that of the planar portion 50a by about 2 mm along arrow Z2 (on the side closer to the lid member 11), while the edge portions 50c are formed on positions higher than that of the planar portion 50a by about 2 mm along arrow Z1 (on the side closer to the casing member 32). The edge portions 50b and 50c are shifted from the planar portion 50a by about 2 mm respectively, so that spring members 61 and 62 described later can be arranged in a clearance between the edge portions 50b and the planar portion 50a along arrow Z2 (between the lower surface of the planar portion 50a and the upper surface of the lid member 11) and a clearance between the edge portions 50c and the planar portion 50a along arrow Z1 (between the upper surface of the planar portion 50a and the lower surface of the casing member 32) respectively. The edge portions 50b are examples of the "first engaging portion" in the present invention, and the edge portions 50c are examples of the "second engaging portion" in the present invention.

According to this embodiment, therefore, the sliding plate 50 is formed to be slidingly moved with respect to the lid member 11 of the operating portion-side body 10 in the direction X through the sliders 51 while the edge portions 50b are fitted along the groove portions 51a of the sliders 51 retained by the guide portions 11a, as shown in FIG. 7. In other words, the portable telephone 100 is so formed that the sliding plate 50 changes from the state shown in FIG. 9 to that shown in FIG. 10 (FIG. 1) when slidingly moved in the direction X. The sliders 51 are fixed to the guide portions 11a, and hence the portable telephone 100 is so formed that the edge portions 50b of the sliding plate 50 slide with respect to the inner side surfaces of the groove portions 51a (see FIG. 7) of the sliders 51 in this case.

Figure 12:
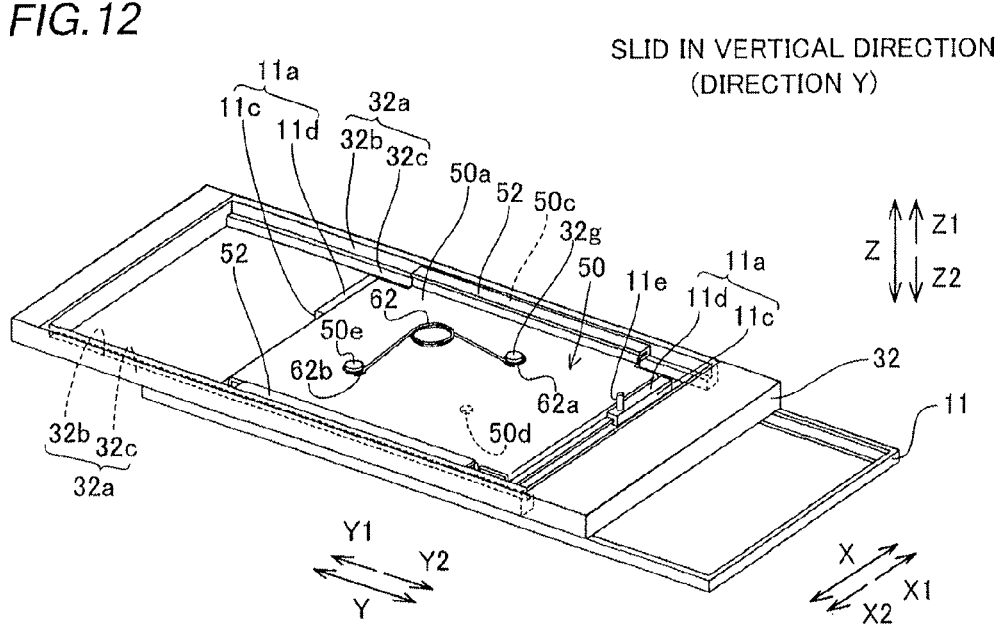

As shown in FIG. 8, the casing member 32 of the display portion-side body 30 is formed to be slidingly moved with respect to the lid member 11 of the operating portion-side body 10 in the direction Y through the sliders 52 while the edge portions 50c of the sliding pate 50 are fitted along the groove portions 52a of the sliders 52 retained by the guide portions 32a. In other words, the portable telephone 100 is so formed that the casing member 32 of the display portion-side body 30 changes from the state shown in FIG. 11 to that shown in FIG. 12 (FIG. 2) when slidingly moved in the direction Y, while the sliding plate 50 is retained by the guide portions 11a and movement in the direction Y is regulated (see FIG. 9 or the like). The sliders 52 are fixed to the edge portions 50c of the sliding plate 50, and hence the portable telephone 100 is so formed that the inner side surfaces (groove portions 32e surrounded by the lower surface 32d (see FIG. 8), the sidewall portions 32b and the beam portions 32c) of the guide portions 32a slide with respect to the outer side surfaces of the sliders 52 in this case. For the purpose of convenience, FIG. 12 shows the inner portion of the casing member 32 in a state removing the upper region including the lower surface 32d thereof.

According to this embodiment, the guide portion 11a of the lid member 11 provided on one side (along arrow Y2) is provided with a pin-shaped protrusion 11e protruding from the corresponding eaves portion 11d upward (along arrow Z1) by a prescribed height, as shown in FIG. 6. As shown in FIG. 6, further, the casing member 32 of the display portion-side body 30 is provided on the lower surface 32d thereof with a guide groove 32f (shown by broken lines) substantially-L-shaped in plan view. The portable telephone 100 is so formed that the protrusion 11e is inserted into the guide groove 32f when the display portion-side body 30 is combined with the operating portion-side body 10 through the sliding plate 50. Thus, the portable telephone 100 is so formed that the protrusion 11e moves in the guide groove 32 along the direction X or Y when the casing member 32 is slid with respect to the lid member 11. The guide groove 32f is so formed in an L-shaped manner as to regulate the movement of the protrusion 11e in the direction X when the casing member 32 is slid with respect to the lid member 11 in the direction Y, and to regulate the movement of the protrusion 11e in the direction Y when the casing member 32 is slid with respect to the lid member 11 in the direction X. Thus, the portable telephone 100 is so formed that the display portion-side body 30 is slidingly moved with respect to the operating portion-side body 10 only in either the direction X or the direction Y. The guide groove 32f may be formed by a groove provided in the casing member 32 with a prescribed depth from the lower surface 32d along arrow Z1, or by a through-hole passing through the casing member 32 along arrow Z1.

Figure 2:
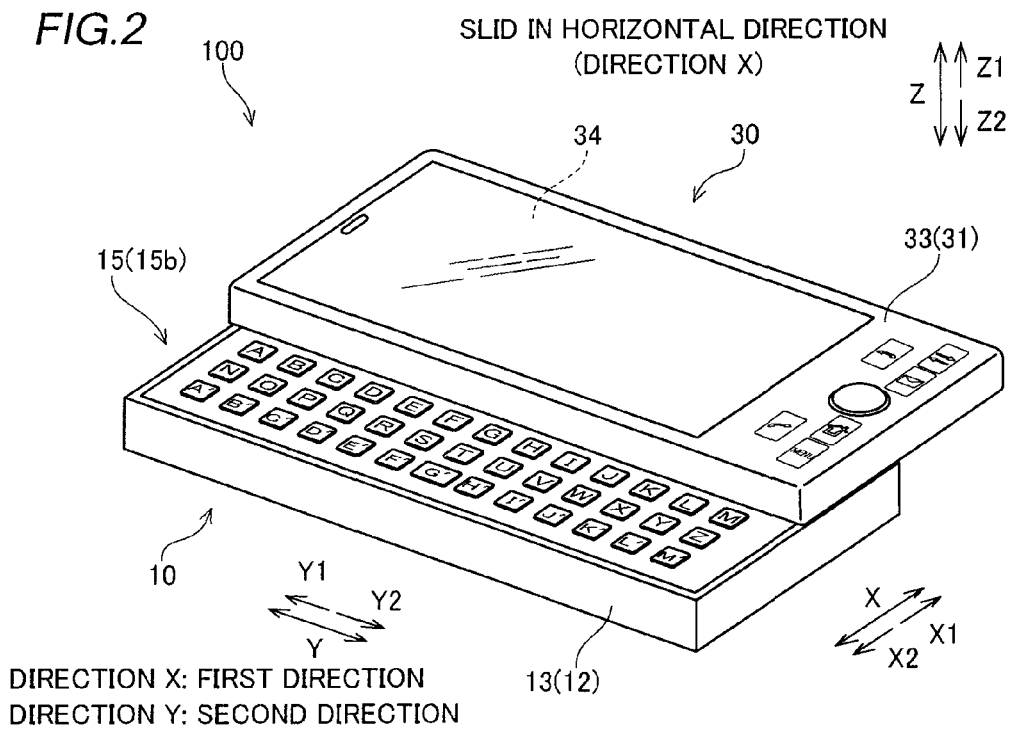
FIG. 2 is a perspective view showing the portable telephone according to the embodiment of the present invention in a state slid in the horizontal direction.

According to this embodiment, the portable telephone 100 so includes the aforementioned sliding mechanism that the user can use the portable telephone 100 in a state sliding the display portion-side body 30 with respect to the operating portion-side body 10 in either the direction X or the direction Y from the initial state shown in FIG. 1. In other words, the user can use the portable telephone 100 as a telephone by operating the operating keys corresponding to the region 15a, exposed on the upper surface of the operating portion-side body 10, of the operating key portion 15 as shown in FIG. 1 when slidingly moving the display portion-side body 30 along arrow Y1. When slidingly moving the display portion-side body 30 along arrow X1, on the other hand, the user can use the portable terminal 100 as an information input terminal (PDA or the like) by operating other operating keys corresponding to a region 15b, exposed on the upper surface of the operating portion-side body 10, of the operating key portion 15, as shown in FIG. 2. The operating keys corresponding to the region 15b and those corresponding to the region 15a are examples of the "first operating key" and the "second operating key" in the present invention respectively.

According to this embodiment, the spring member 61 consisting of a torsion spring is pivotably mounted between the lid member 11 and the sliding plate 50, as shown in FIG. 6. More specifically, a ringlike end portion 61a of the spring member 61 is pivotably engaged with a boss portion 11f provided on the lid member 11 to protrude along arrow Z1, and another ringlike end portion 61b of the spring member 61 is pivotably engaged with a boss portion 50d provided on the lower surface of the planar portion 50a of the sliding plate 50. The spring member 61 is an example of the "first spring member" in the present invention.

Figure 13:
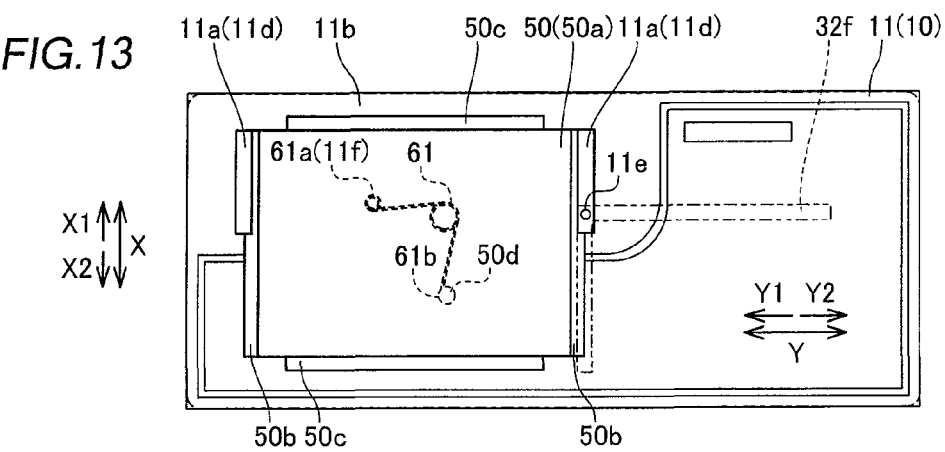
FIGS. 13 to 15 are plan views for illustrating arrangements of a spring member in a case where the display portion-side housing shown in FIG. 2 is slidingly moved with respect to the operating portion-side housing in a direction X.
Figure 14:
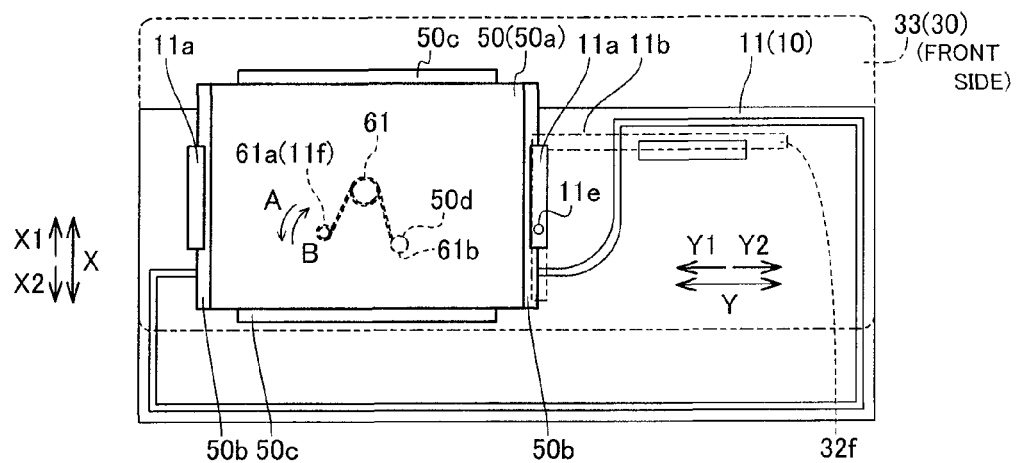
Figure 15:
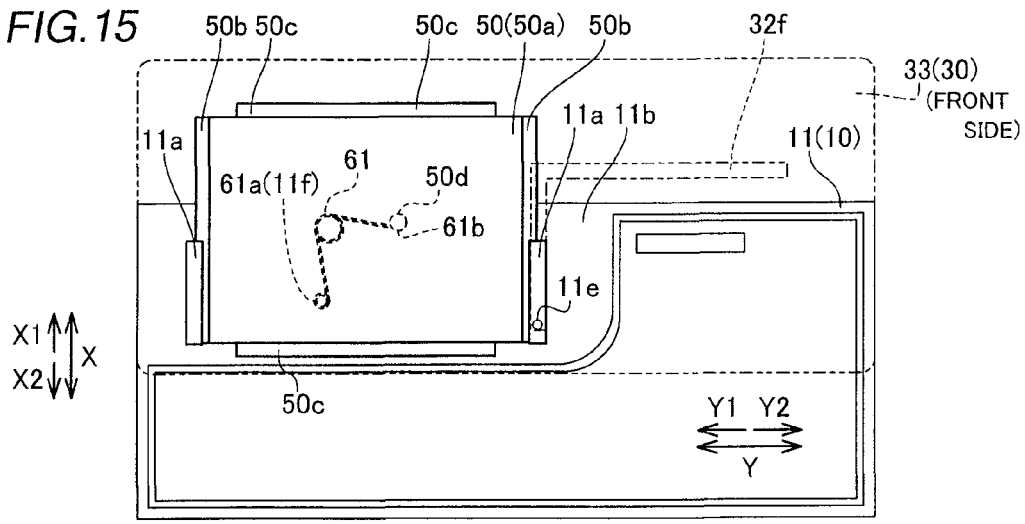

Thus, the portable telephone 100 is so formed that, when the display portion-side body 30 is completely superposed on the operating portion-side body 10 (in the initial state shown in FIG. 3), the spring member 61 (shown by broken lines) is arranged on a position shown in FIG. 13, thereby regularly pressing the casing member 32 (see FIG. 11) along arrow X2 through the elastic force thereof. On the other hand, the portable telephone 100 is so formed that, when the user starts sliding the display portion-side body 30 (see FIG. 3) with respect to the operating portion-side body 10 along arrow X1, the boss portion 50d of the sliding plate 50 moves with respect to the boss portion 11f of the lid member 11 along arrow X1 as shown in FIG. 14, whereby the spring member 61 gradually pivots on the end portion 61a in a direction A. The spring member 61 is deformed to reduce the distance between the end portions 61a and 61b when starting pivoting in the direction A, and hence it follows that the user slidingly moves the display portion-side body 30 along arrow X1 against the urging force of the spring member 61 along arrow X2. Further, the portable telephone 100 is so formed that, when the spring member 61 pivots in the direction A in the aforementioned sliding operation, the urging force of the spring member 61 switches from the direction along arrow X2 to that along arrow X1 in an intermediate stage of the pivoting operation of the spring member 61. The portable telephone 100 is so formed that, when the display portion-side body 30 is completely slidingly moved along arrow X1, the spring member 61 (shown by broken lines) is arranged on a position shown in FIG. 15, thereby regularly pressing the casing member 32 (see FIG. 11) along arrow X1 through the elastic force thereof. The portable telephone 100 is so formed that, also when the user slides the display portion-side body 30 from the direction along arrow X1 to that along arrow X2, the urging force of the spring member 61 switches from the direction along arrow X1 to that along arrow X2 while the spring member 61 pivots in the direction (direction B) opposite to the above in an intermediate stage of the sliding operation. Thus, the portable telephone 100 is formed to assist the sliding operation of the display portion-side body 30 (see FIG. 3) through the change of the urging direction following the pivoting operation of the spring member 61 when the user reciprocates the display portion-side body 30 in the direction X. For the purpose of convenience, FIGS. 13 to 15 show the sliding plate 50 in a state removing the casing member 32

(while showing only the positions of the guide groove 32*f* engaging with the protrusion 11*e* of the lid member 11 in two-dot chain lines).

Similarly to the above, the spring member 62 consisting of a torsion spring is pivotably mounted between the casing member 32 and the sliding plate 50. More specifically, a ringlike end portion 62*a* of the spring member 62 is pivotably engaged with a boss portion 32*g* provided on the casing member 32 (lower surface 32*d*) to protrude along arrow Z2, while another ringlike end portion 62*b* of the spring member 62 is pivotably engaged with a boss portion 50*e* provided on the upper surface of the planar portion 50*a* of the sliding plate 50. The spring member 62 is an example of the "second spring member" in the present invention.

Thus, the portable telephone 100 is so formed that, when the display portion-side body 30 (see FIG. 1) is completely superposed on the operating portion-side body 10, the spring member 62 is arranged on a position shown in FIG. 16, thereby regularly pressing the casing member (see FIG. 11) along arrow Y2 through the elastic force thereof. On the other hand, the portable telephone 100 is so formed that, when the user starts slidingly moving the display portion-side body 30 (see FIG. 1) with respect to the operating portion-side body 10 along arrow Y1, the boss portion 32*g* of the casing member 32 moves with respect to the boss portion 50*e* of the sliding plate 50 along arrow Y1 as shown in FIG. 17, whereby the spring member 62 gradually pivots on the end portion 62*a* in the direction B. The spring member 62 is deformed to reduce the distance between the end portions 62*a* and 62*b* when starting pivoting in the direction B, and hence it follows that the user slidingly moves the display portion-side body 30 along arrow Y1 against the urging force of the spring member 62 along arrow Y2. The portable telephone 100 is so formed that, when the spring member 62 pivots in the direction B in the aforementioned sliding operation, the urging force of the spring member 62 switches from the direction along arrow Y2 to that along arrow Y1 in an intermediate stage of the pivoting operation of the spring member 62. The portable telephone 100 is so formed that, when the display portion-side body 30 is completely slid along arrow Y1, the spring member 62 is arranged on a position shown in FIG. 18, thereby regularly pressing the casing member 32 (see FIG. 11) along arrow Y1 through the elastic force thereof. The portable telephone 100 is so formed that, also when the user slidingly moves the display portion-side body 30 from the direction along arrow Y1 to that along arrow Y2, the urging force of the spring member 62 switches from the direction along arrow Y1 to that along arrow Y2 while the spring member 62 pivots in the direction (direction A) opposite to the above in an intermediate stage of the sliding operation. Thus, the portable telephone 100 is formed to assist the sliding operation of the display portion-side body 30 (see FIG. 1) through the change of the urging direction following the pivoting of the spring member 62 when the user reciprocates the display portion-side body 30 in the direction Y. For the purpose of convenience, FIGS. 16 to 18 show the sliding plate 50 in a state removing the operating key portion 15 (the region 15*a* etc. shown in FIG. 1) exposed simultaneously with the sliding operation. Further, FIGS. 16 to 18 show sliding positions of the guide groove 32*f* of the casing member 32 engaging with the protrusion 11*e* of the lid member 11 in two-dot chain lines.

According to this embodiment, as hereinabove described, the portable telephone 100 is provided with the sliders 51 and 52, for engaging the guide portions 11*a* and 32*a* of the operating portion-side body 10 and the display portion-side body 30 with the sliding plate 50 through the sliders 51 and 52 respectively. Thus, a clearance (see FIG. 7) between the sliding plate 50 and the guide portion 11*a* and that (see FIG. 8) between the sliding plate 50 and the guide plate 32*a* can be further reduced, due to the sliders 51 and 52 interposed between the sliding plate 50 and the guide portions 11*a* and 32*a* respectively. Consequently, both of the display portion-side body 30 and the operating portion-side body 10 can be inhibited from jolting when the user slidingly moves the display portion-side body 30 with respect to the operating portion-side body 10.

According to this embodiment, the sliding plate 50 is made of the metal, while the sliders 51 and 52 are made of resin such as POM having excellent slidableness. Thus, frictional noises resulting from rubbing between the sliding plate 50 and the sliders 51 and 52 can be reduced as compared with a case where all of the sliding plate 50 and the sliders 51 and 52 are made of metals, due to the contact between the metal member and the resin members. Therefore, jolting in sliding movement can be reduced while reducing noises (scrabbly noises) resulting from the sliding movement.

According to this embodiment, the portable telephone 100 is so formed that the sliders 51 are engaged with the guide portions 11*a* of the operating portion-side body 10 in the state where the groove portions 51*a* are arranged to hold the edge portions 50*b* of the sliding plate 50. Further, the portable telephone 100 is so formed that the sliders 52 are engaged with the guide portions 32*a* of the display portion-side body 30 in the state where the groove portions 52*a* are arranged to hold the edge portions 50*c* of the sliding plate 50. Thus, the sliders 51 and 52 can slidably retain the sliding plate 50 while holding the sliding plate 50 together. Therefore, contact areas between the sliding plate 50 and the sliders 51 and 52 can be sufficiently ensured, whereby both of the display portion-side housing 33 and the operating portion-side housing 13 can be reliably inhibited from jolting when the user slidingly moves the display portion-side body 30 with respect to the operating portion-side body 10.

According to this embodiment, the portable telephone 100 is so formed that the edge portions 50*b* of the sliding plate 50 are fitted into the substantially U-shaped groove portions 50*a* of the sliders 51 while the substantially U-shaped sliders 51 are fitted into spaces between the upper surface of the lid member 11 and the substantially U-shaped guide portions 11*a* and the edge portions 50*c* of the sliding plate 50 are fitted into the substantially U-shaped groove portions 52*a* of the sliders 52 while the sliders 52 are fitted into spaces between the lower surface of the casing member 32 and the substantially L-shaped guide portions 32*a*. Thus, the edge portions 50*b* (edge portions 50*c*) can be slidably retained with respect to the guide portions 11*a* (guide portions 32*a*) through wider contact areas, by utilizing the inner and outer side surfaces of the sliders 51 (sliders 52).

According to this embodiment, the portable telephone 100 is so formed that the user slidingly moves the sliding plate 50 with respect to the lid member 11 (operating portion-side body 10) along the direction X by sliding the edge portions 50*b* thereof with respect to the inner side surfaces of the substantially U-shaped groove portions 51*a* of the sliders 51 holding the edge portions 50*b*. Thus, the user can easily slidingly move the sliding plate 50 with respect to the lid member 11 (operating portion-side body 10) in the direction X by effectively utilizing the inner or outer side surfaces of the sliders 51 interposed between the lid member 11 and the sliding plate 50.

According to this embodiment, the portable telephone 100 is so formed that the user slidingly moves the casing member 32 (display portion-side body 30) with respect to the sliding plate 50 along the direction Y by sliding the guide portions 32a thereof with respect to the outer side surfaces of the sliders 52 holding the edge portions 50c. Thus, the user can easily slidingly move the casing member 32 (display portion-side body 30) with respect to the sliding plate 50 in the direction Y by effectively utilizing the outer side surfaces of the sliders 52 interposed between the casing member 32 and the sliding plate 50.

According to this embodiment, the guide portions 11a are integrally provided on the lid member 11 of the operating portion-side body 10, while the guide portions 32a are integrally provided on the casing member 32 of the display portion-side body 30. Thus, increase in the number of components constituting the portable telephone 100 can be suppressed, dissimilarly to a case of providing the guide portions 11a independently of the lid member 11 or providing the guide portions 32a independently of the casing member 32. Consequently, the sliding mechanism can be simplified.

According to this embodiment, the pair of guide portions 32a are provided on the lower surface of the casing member 32 to be opposed to each other at a prescribed interval in the direction X, while the pair of guide portions 11a are provided on the upper surface of the lid member 11 to be opposed to each other at a prescribed interval along the direction Y. Further, the edge portions 50b are provided on both end portions of the sliding plate 50 in the direction X, while the edge portions 50c are provided on both end portions of the sliding plate 50 in the direction Y. The sliding plate 50 is so formed that the edge portions 50b and 50c thereof are retained by the pairs of guide portions 32a and 11a respectively in plan view. Thus, the user can stably slidingly move the sliding plate 50 with respect to the guide portions 11a and 32a in the directions X and Y respectively.

According to this embodiment, the edge portions 50b are provided on the vertical positions closer to the lid member 11 (operating portion-side body 10) than the planar portion 50a, while the edge portions 50c are provided on the vertical positions closer to the casing member 32 (display portion-side body 30) opposite to the edge portions 50b than the planar portion 50a. Thus, the edge portions 50b and 50c are retained by the guide portions 11a and 32a on the vertical positions (in the direction Z) different from each other respectively. Therefore, the user can relatively slidingly move the operating portion-side body 10 and the display portion-side body 30 in the direction (direction X or Y) of movement with no interference therebetween.

According to this embodiment, the edge portions 50b and 50c are integrally formed on the sliding plate 50. Thus, at least either the edge portions 50b or the edge portions 50c can be easily inhibited from coming off the sliding plate 50, dissimilarly to a case of providing the edge portions 50b and 50c independently of the sliding plate 50.

According to this embodiment, the portable telephone 100 is so formed that the user slidingly moves the sliding plate 50 with respect to the guide portions 11a along the direction X while slidingly moving the casing member 32 (display portion-side body 30) with respect to the sliding plate 50 along the direction Y. Thus, the user can move the display portion-side body 30 in the direction X by moving the sliding plate 50 with respect to the lid member 11, and can move the display portion-side body 30 in the direction Y by moving the casing member 32 with respect to the sliding plate 50. Therefore, the user can efficiently slidingly move the display portion-side body 30 with respect to the operating portion-side body 10 in both of the directions X and Y.

According to this embodiment, the length (in the direction Y) of the edge portions 50b of the sliding plate 50 is larger than the length (in the direction X) of the guide portions 11a, while the length (in the direction Y) of the edge portions 50c of the sliding plate 50 is smaller than the length (in the direction X) of the guide portions 32a. Thus, the user can stably slidingly move the sliding plate 50 with respect to the lid member 11 (operating portion-side body 10) along the direction X. Further, the user can stably slidingly move the casing member 32 (display portion-side body 30) with respect to the sliding plate 50 in a moving range along the direction Y.

According to this embodiment, the sliders 51 are fixed to the guide portions 11a of the lid member 11, whereby the user can smoothly slidingly move the sliding plate 50 with respect to the lid member 11.

According to this embodiment, the portable telephone 100 includes the operating key portion 15 including the operating keys of the region 15b used with respect to the display portion-side body 30 when the user slidingly moves the display portion-side body 30 with respect to the operating portion-side body 10 in the direction X and the operating keys of the region 15a used with respect to the display portion-side body 30 when the user slidingly moves the display portion-side body 30 with respect to the operating portion-side body 10 in the direction Y. Thus, the user can use the operating keys of the regions 15a and 15b of the single operating key portion 15 in response to the position of the display portion-side body 30 slid with respect to the operating portion-side body 10, whereby increase in the number of components can be suppressed and the structure of the portable telephone 100 (operating portion-side body 10) can be simplified, dissimilarly to a case of providing the operating keys on different operating key portions.

According to this embodiment, the portable telephone 100 includes the spring member 61 provided to couple the sliding plate 50 and the operating portion-side body 10 with each other and generating the urging force for the sliding movement in the direction X when the user relatively slidingly moves the display portion-side body 30 with respect to the operating portion-side body 10 in the direction X. Thus, the user can slidingly move the display portion-side body 30 with respect to the operating portion-side body 10 in the direction X (along arrows X1 and X2) through the urging force of the spring member 61, thereby easily slidingly moving the display portion-side body 30 in the direction X.

According to this embodiment, the portable telephone 100 includes the spring member 62 provided to couple the sliding plate 50 and the display portion-side body 30 with each other and generating the urging force for the sliding movement in the direction Y when the user relatively slidingly moves the display portion-side body 30 with respect to the operating portion-side body 10 in the direction Y. Thus, the user can slidingly move the display portion-side body 30 with respect to the operating portion-side body 10 in the direction Y (along arrows Y1 and Y2) through the urging force of the spring member 62, thereby easily slidingly moving the display portion-side body 30 in the direction Y.

According to this embodiment, the spring member 61 is arranged in a region between the vertical positions of the planar portion 50a and the edge portions 50b (in the clearance between the lower surface of the planar portion 50a and the upper surface of the lid member 11) while the spring member 62 is arranged in a region between the vertical positions of the planar portion 50a and the edge portions 50c (in the clearance between the upper surface of the planar portion 50a and the lower surface of the casing member 32). Thus, the spring member 61 can be easily stored in a stepped space formed by the planar portion 50a and the guide portions 11a (in the clearance between the lower surface of the planar portion 50a and the upper surface of the lid member 11), while the spring member 62 can be easily stored in a stepped space formed by the planar portion 50a and the guide portions 32a (in the clearance between the upper surface of the planar portion 50a and the lower surface of the casing member 32). Consequently, the user can slidingly move the display portion-side body 30 with respect to the operating portion-side body 10 without difficulty, despite the spring members 61 and 62 provided on the portable telephone 100.

According to this embodiment, the spring members 61 and 62 consist of the torsion springs. Thus, driving force for slidingly moving the display portion-side housing 33 with respect to the operating portion-side housing 13 in the directions X and Y can be easily obtained by properly utilizing the urging force (restoring force) of the torsion springs.

According to this embodiment, the guide groove 32f is formed in the casing member 32 while the extensional directions thereof substantially coincide with the directions X and Y, and the protrusion 11e so moves in the substantially L-shaped guide groove 32f that, when the user slidingly moves the display portion-side body 30 with respect to the operating portion-side body 10 along either the direction X or the direction Y, the display portion-side body 30 is not slidingly moved with respect to the operating portion-side body 10 along either the direction Y or the direction X. Thus, the direction of movement of the display portion-side body 30 with respect to the operating portion-side body 10 can be regulated to either the direction X or the direction Y, whereby the user can easily switch a control mode for the portable telephone 100 in response to each direction of movement.

According to this embodiment, the protrusion 11e is pin-shaped, and integrally formed on one of the guide portions 11a of the lid member 11. Thus, the manufacturing process for and the structure of the lid member 11 can be simplified, dissimilarly to a case of providing the protrusion 11e and the guide portion 11a independently of each other.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the portable telephone 100 as the exemplary portable terminal in the aforementioned embodiment, the present invention is not restricted to this, but is also applicable to another portable terminal, other than the portable telephone, formed to function as an electronic game machine when the user slides a display portion-side housing in a first direction and to function as a personal computer when the user slides the display portion-side housing in a second direction orthogonal to the first direction, for example, so far as the display portion-side housing is slidingly movable with respect to an operating portion-side housing.

While the portable telephone 100 is formed to control (assist) the sliding operation of the display portion-side body 30 with respect to the operating portion-side body 10 in the directions X and Y with the spring members 61 and 62 consisting of the torsion springs in the aforementioned embodiment, the present invention is not restricted to this. For example, the portable telephone 100 may alternatively be formed to control the sliding operation with spring members (urging members) consisting of plate springs or coil springs other than the torsion springs.

While the sliding plate 50 is made of sheet metal (metal) in the aforementioned embodiment, the present invention is not restricted to this, but the sliding plate 50 may alternatively be formed by a molded product of resin.

Figure 19:
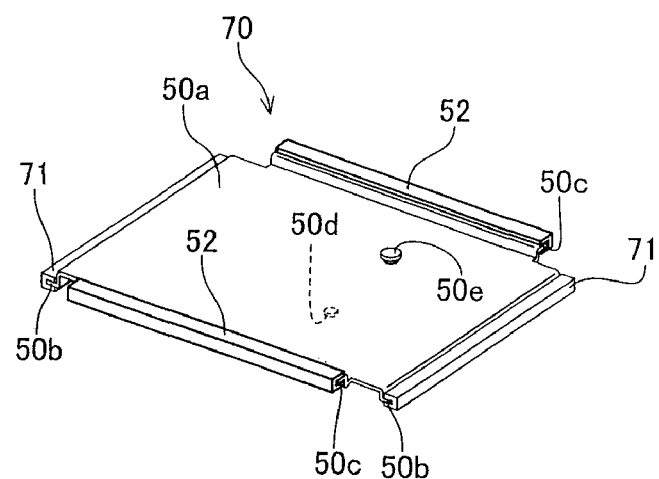
FIG. 19 is a perspective view showing the structure of a sliding plate according to a modification of the embodiment of the present invention.

While the sliders 51 are so fixed into the groovelike regions of the guide portions 11a that the sliding plate 50 (edge portions 50b) slides with respect to the inner side surfaces of the groove portions 51a (see FIG. 7) in the sliding mechanism between the sliding plate 50 and the lid member 11 in the aforementioned embodiment, the present invention is not restricted to this. Alternatively, a portable telephone may be so formed that sliders 71 substantially identical in length to edge portions 50b are previously fitted into and fixed to the edge portions 50b of a sliding plate 70, as in a modification of the embodiment of the present invention shown in FIG. 19, for example. In this case, sliders 52 and the sliders 71 of resin may be integrally formed on the sliding plate 70 of a metal by insertion molding. In this case, the portable telephone is so formed that outer side surfaces of the sliders 71 fixed to the edge portions 50b slide with respect to the inner surfaces of the guide portions 11a (substantially U-shaped inner side surfaces surrounded by the upper surface, the sidewall portions 11c and the eaves portions 11d of the lid member 11 shown in FIG. 7). The sliders 71 are examples of the "first sliding member" in the present invention. According to the structure of this modification, the sliders 71 and 52 can be combined with the operating portion-side body 10 and the display portion-side body 30 in the state previously mounted on the sliding plate 70, whereby an operation of assembling the portable telephone 100 can be further simplified. Further, the sliders 71 are fixed to the guide portions 11a, whereby the user can smoothly slidingly move the sliding plate 50 with respect to the operating portion-side housing 13.

While the pin-shaped protrusion 11e is formed on the lid member 11 and the guide groove 32f is formed on the casing member 32 in the aforementioned embodiment, the present invention is not restricted to this, but a guide groove may be formed on the lid member 11, and a protrusion engaging with the guide groove may be formed on the casing member 32.

While the portable telephone 100 is so formed that the display portion-side body 30 is slidingly movable with respect to the operating portion-side body 10 in the direction X and the direction Y orthogonal to the direction X in the aforementioned embodiment, the present invention is not restricted to this. For example, the portable telephone 100 may alternatively be so formed that the display portion-side body 30 is slidingly movable with respect to the operating portion-side body 10 in directions other than the directions X and Y, so far as the "first direction" and the "second direction" in the present invention intersect with each other.

What is claimed is:

1. A portable terminal comprising:
    an operating portion-side housing, provided with an operating portion, having an operating portion-side guide portion;
    an L-shaped operating key portion arranged on said operating portion-side housing;
    a display portion-side housing, provided with a display portion, having a display portion-side guide portion;
    a sliding plate arranged between said display portion-side housing and said operating portion-side housing and arranged so as to cover said L-shaped operating key portion for relatively slidingly moving said display portion-side housing with respect to said operating portion-side housing in a first direction and a second direction intersecting with said first direction;
    a first sliding member arranged between said operating portion-side guide portion of said operating portion-side housing and said sliding plate; and a second sliding member arranged between said display portion-side guide portion of said display portion-side housing and said sliding plate, wherein said operating portion-side guide portion of said operating portion-side housing is engaged with said sliding plate through said first sliding member, and said display portion-side guide portion of said display portion-side housing is engaged with said sliding plate through said second sliding member, said L-shaped operating key portion includes a first operating key and a second operating key, said first operating key is exposed on the upper surface of said operating portion-side housing so as to become operable such that said sliding plate is slidingly moved through said first sliding member in said first direction toward a position where said first operating key is not covered with said sliding plate when said display portion-side housing is slidingly moved in said first direction, and said second operating key is exposed on the upper surface of said operating portion-side housing so as to become operable such that said sliding plate is not slidingly moved but said display portion-side housing is slidingly moved through said second sliding member in said second direction toward a position where said second operating key is not covered with said display portion-side housing when said display portion-side housing is slidingly moved in said second direction.

2. The portable terminal according to claim 1, wherein said sliding plate is made of a metal, while said first sliding member and said second sliding member are made of resin respectively.

3. The portable terminal according to claim 1, wherein said sliding plate includes a first engaging portion provided to extend in said first direction and a second engaging portion provided to extend in said second direction, said first sliding member is engaged with said operating portion-side guide portion of said operating portion-side housing in a state arranged to hold said first engaging portion of said sliding plate, and said second sliding member is engaged with said display portion-side guide portion of said display portion-side housing in a state arranged to hold said second engaging portion of said sliding plate.

4. The portable terminal according to claim 3, wherein said operating portion-side guide portion and said display portion-side guide portion have substantially L-shaped sections respectively, said first sliding member and said second sliding member have substantially U-shaped sections respectively, and the portable terminal is so formed that said first engaging portion of said sliding plate is fitted into a groove portion of substantially U-shaped said first sliding member in a state where substantially U-shaped said first sliding member is fitted into a space between the upper surface of said operating portion-side housing and substantially L-shaped said operating portion-side guide portion while said second engaging portion of said sliding plate is fitted into a groove portion of substantially U-shaped said second sliding member in a state where said second sliding member is fitted into a space between the lower surface of said display portion-side housing and substantially L-shaped said display portion-side guide portion.

5. The portable terminal according to claim 3, wherein said sliding plate is formed to be slidingly moved with respect to said operating portion-side housing along said first direction by sliding said first engaging portion with respect to the inner side surface of a substantially U-shaped groove portion of said first sliding member holding said first engaging portion or by sliding the outer side surface of said first sliding member with respect to said operating portion-side guide portion of said operating portion-side housing.

6. The portable terminal according to claim 5, wherein said display portion-side housing is formed to be slidingly moved with respect to said sliding plate along said second direction by sliding said display portion-side guide portion with respect to the outer side surface of said second sliding member holding said second engaging portion.

7. The portable terminal according to claim 3, wherein said operating portion-side guide portion is integrally provided on said operating portion-side housing, while said display portion-side guide portion is integrally provided on said display portion-side housing.

8. The portable terminal according to claim 3, wherein a pair of said display portion-side guide portions are provided on the lower surface of said display portion-side housing to be opposed to each other at an interval in said first direction, while a pair of said operating portion-side guide portions are provided on the upper surface of said operating portion-side housing to be opposed to each other at an interval along said second direction, said first engaging portions are provided on both end portions of said sliding plate in said first direction while said second engaging portions are provided on both end portions of said sliding plate in said second direction, and said sliding plate is so formed that said first engaging portions are retained by said pair of display portion-side guide portions and said second engaging portions are retained by said pair of operating portion-side guide portions in plan view.

9. The portable terminal according to claim 8, wherein said sliding plate further includes a planar portion connecting said first engaging portions and said second engaging portions with each other, and said first engaging portions are provided on vertical positions closer to said operating portion-side housing than said planar portion, while said second engaging portions are provided on vertical positions closer to said display portion-side housing, opposite to said first engaging portions, than said planar portion.

10. The potable terminal according to claim 3, wherein said first engaging portion and said second engaging portion are integrally formed on said sliding plate.

11. The portable terminal according to claim 3, so formed that said sliding plate is slidingly moved with respect to said operating portion-side guide portion along said first direction while said display portion-side housing is slidingly moved with respect to said sliding plate along said second direction.

12. The portable terminal according to claim 11, wherein the length of said first engaging portion of said sliding plate is larger than the length of said operating portion-side guide portion, while the length of said second engaging portion of said sliding plate is smaller than the length of said display portion-side guide portion.

13. The portable terminal according to claim 11, wherein said first sliding member is fixed to said operating portion-side guide portion of said operating portion-side housing, or fixed to said first engaging portion of said sliding plate.

14. The portable terminal according to claim 11, wherein said first sliding member is fixed to said operating portion-side guide portion of said operating portion-side housing.

15. The portable terminal according to claim 1, further comprising:
   a first spring member provided to couple said sliding plate and said operating portion-side housing with each other for generating urging force for sliding movement in said first direction when relatively slidingly moving said display portion-side housing with respect to said operating portion-side housing in said first direction, and
   a second spring member provided to couple said sliding plate and said display portion-side housing with each other for generating urging force for sliding movement in said second direction when relatively slidingly moving said display portion-side housing with respect to said operating portion-side housing in said second direction.

16. The portable terminal according to claim 15, wherein said sliding plate includes a first engaging portion provided to extend in said first direction, a second engaging portion provided to extend in said second direction, and a planar portion connecting said first engaging portion and said second engaging portion with each other,
   said first engaging portion is provided on a vertical position closer to said operating portion-side housing than said planar portion while said second engaging portion is provided on a vertical position closer to said display portion-side housing, opposite to said first engaging portion, than said planar portion, and
   said first spring member is arranged in a region between a vertical position of said planar portion and said vertical position of said first engaging portion, while said second spring member is arranged in a region between said vertical position of said planar portion and said vertical position of said second engaging portion.

17. The portable terminal according to claim 15, wherein said first spring member and said second spring member are torsion springs.

18. The portable terminal according to claim 1, wherein said operating portion-side housing further includes a protrusion engaging with said display portion-side housing,
   said display portion-side housing further includes a substantially L-shaped guide groove engaging with said protrusion when said display portion-side housing is slidingly moved with respect to said operating portion-side housing,
   said guide groove is formed on said display portion-side housing in a state where the extensional directions of said guide groove substantially coincide with the respective ones of said first direction and said second direction, and
   said protrusion so moves in said substantially L-shaped guide groove that, when said display portion-side housing is slidingly moved with respect to said operating portion-side housing along either said first direction or said second direction, said display portion-side housing is not slidingly moved with respect to said operating portion-side housing along either said second direction or said first direction.

19. The portable terminal according to claim 18, wherein said protrusion is in the form of a pin, and integrally formed on said operating portion-side guide portion of said operating portion-side housing.

* * * * *